_United States Patent_ [19]

Giuntoli

[11] Patent Number: 5,917,888
[45] Date of Patent: Jun. 29, 1999

[54] SYSTEM AND METHOD FOR ENHANCED TELECOMMUNICATIONS RELAY SERVICE WITH EASY EXTENSION FEATURE

[75] Inventor: Robert W. Giuntoli, Miami, Fla.

[73] Assignee: MCI Communications Corporation, Washington, D.C.

[21] Appl. No.: 08/873,894

[22] Filed: Jun. 12, 1997

Related U.S. Application Data

[63] Continuation of application No. 08/673,650, Jun. 28, 1996, abandoned.

[51] Int. Cl.$^6$ .................................................. H04M 11/00
[52] U.S. Cl. ............................ 379/52; 379/201; 379/265; 379/308; 340/825.19
[58] Field of Search ............................... 379/52, 36, 144, 379/201, 265, 308, 309, 93.01, 93.17, 93.18, 93.23, 93.27; 340/825.19

[56] References Cited

U.S. PATENT DOCUMENTS

| | | | |
|---|---|---|---|
| 4,757,267 | 7/1988 | Riskin | 379/201 |
| 5,163,081 | 11/1992 | Wycherley et al. | 379/52 |
| 5,311,572 | 5/1994 | Friedes et al. | 379/201 |
| 5,396,536 | 3/1995 | Yudkowsky | 379/52 |
| 5,559,855 | 9/1996 | Dowens et al. | 379/52 |
| 5,787,148 | 7/1998 | August | 379/52 |

OTHER PUBLICATIONS

N.A. Osman–Allu, "Telecommunication Interfaces for Deaf People," *IEE Colloquium on 'Special Needs and the Interface,'* Jan. 13, 1993, London, England.

*Primary Examiner*—Wing F. Chan

[57] ABSTRACT

A system and method for easily directing a telephone call from a hearing caller using a standard telephone to a deaf, hard of hearing, or speech disabled person using a text telephone via a telecommunication relay system including a communications assistant. The telecommunications relay system is a central location where hearing callers dial a toil-free number and request a specific extension number. Based on that specific extension number, the system finds an associated subscriber profile that comprises the name, actual ten-digit telephone number, and service description option of the text telephone user. The telephone call is then relayed to the text telephone user after the dialing of the actual telephone number. The communications assistant then introduces the hearing caller to the text telephone user according to the specific service description option which was selected by the text telephone user when they applied for the telecommunications relay system service.

7 Claims, 5 Drawing Sheets

SYSTEM AND METHOD FOR ENHANCED TELECOMMUNICATIONS RELAY SERVICE WITH EASY EXTENSION FEATURE

This application is a continuation of application Ser. No. 08/673,650, filed Jun. 28, 1996, now abandoned.

BACKGROUND OF THE INVENTION

1. Field of the Invention

This invention relates generally to telecommunications and more specifically, to the use of telecommunications relay services and communication assistants to facilitate communications between hearing parties using ordinary telephones and deaf, hard of hearing, or speech disabled parties using a Text Telephone, such as a Telecommunication Devices for the Deaf.

2. Related Art

Deaf hard of hearing, or speech disabled persons utilize Text Telephones, such as Telecommunication Devices for the Deaf, to communicate over the telephone with hearing parties using ordinary telephones. These deaf, hard of hearing, or speech disabled parties must often utilize a Telecommunications Relay Service (TRS) in conjunction with Text Telephones. FIG. 1 illustrates a typical TRS environment 102. A hearing caller 104 places a call using an ordinary telephone 106 to a TRS service 109 via a speaking means 108. The TRS service 109 consists of a Communication Assistant (CA) 110 who relays the call to a text telephone 114, communicating via a typing means 112, so that a text telephone user 116 can communicate with the hearing caller 104. The CA 110 acts as a translator between the hearing caller 104 and the text telephone user 116. The system also works in reverse, where the text telephone user 116, can initiate the telephone call to the hearing customer 104 with the CA 110 performing the same function as described above.

The use and implementation of TRS as well as other text telephony devices are well known in the art. There are well known methods used to provide deaf, hard of hearing, and speech disabled people with better access to the telephone network services available to hearing customers. These methods include TRS, direct person-to-person Text Telephone use, E-mail, and electronic information databases. The present invention focuses on the TRS method.

The TRS environment 102 has its disadvantages because the hearing caller 104, when initiating a telephone call, must remember or make note of two different telephone numbers: (1) the telephone number of the Telecommunication Relay Service (each state currently contracts individually with a carrier to provide the relay service); and (2) the telephone number of the text telephone user 116 so that the CA 110 can connect the call. This is a particular problem in commercial situations where the volume of calls the text telephone user 116 may receive will be impacted. A typical business advertisement for a TRS subscriber is shown below in Table 1:

TABLE 1

ROBERT'S MARKETING COMPANY
200 Beech Ave.
Sand, FL 12345
Phone: Please call 1-800-955-8770 (TRS) first,
and give CA this number: 555-1810
FAX: 555-1820

The problem is that the advertisement needs to contain more information, uses more lines, and consequently, costs the TRS subscriber more money. Furthermore, it may confuse potential customers who are not familiar with TRS or know what a CA is. Some customers may be tempted to call the second number directly resulting in a great deal of aggravation for both parties involved. Therefore, hearing callers, as potential customers to TRS subscribers, may not want to deal with the confusion or inconvenience of dealing with a TRS telephone number.

The net result of the TRS environment 102, in a commercial sense, is loss of business (that is, money) and an overall competitive disadvantage. Thus, there is a need to have deaf hard of hearing, or speech disabled users' telephone service more closely resemble the services routinely used by hearing people and level the playing field. Commercial TRS subscribers require that any difference in their telephone service be as transparent as possible to their potential customers.

SUMMARY OF THE INVENTION

The present invention is directed to a system and method for providing an enhanced telecommunications relay service (TRS) to deaf, hard of hearing, or speech disabled telephone users by allowing them to advertise, publish, or distribute a single toll-free telephone (i.e., "1-800") number, with an extension number, to prospective callers. The enhanced TRS, available on subscription basis, assigns each text telephone user an extension number, which they may advertise along with the single toll-free number. Thus, callers dial the single advertised telephone number and just ask for the specific extension number. The communications assistant (CA), who will be relaying the telephone call, can input the extension number into the system that retrieves a subscriber profile. The subscriber profile consists of the actual ten-digit telephone number of the subscriber and the CA can then connect the call. The subscriber's profile also consists of a service description that tells the CA how to introduce the caller to the subscriber.

The present invention functions in the same way as a traditional TRS, allowing hearing persons to communicate with the deaf, hard of hearing, or speech disabled via the telephone and a CA. However, the present invention allows the hearing customer to only deal with one telephone number and makes the use of TRS as transparent and easy as possible to the hearing caller. Further features and advantages of the invention, as well as the structure and opera tion of various embodiments of the invention, are described in detail below with reference to the accompanying diagrams.

BRIEF DESCRIPTION OF THE FIGURES

The present invention will be described with reference to the accompanying drawings, wherein.

DETAILED DESCRIPTION OF THE PREFERRED EMBODIMENTS

Overview

Figure 1:
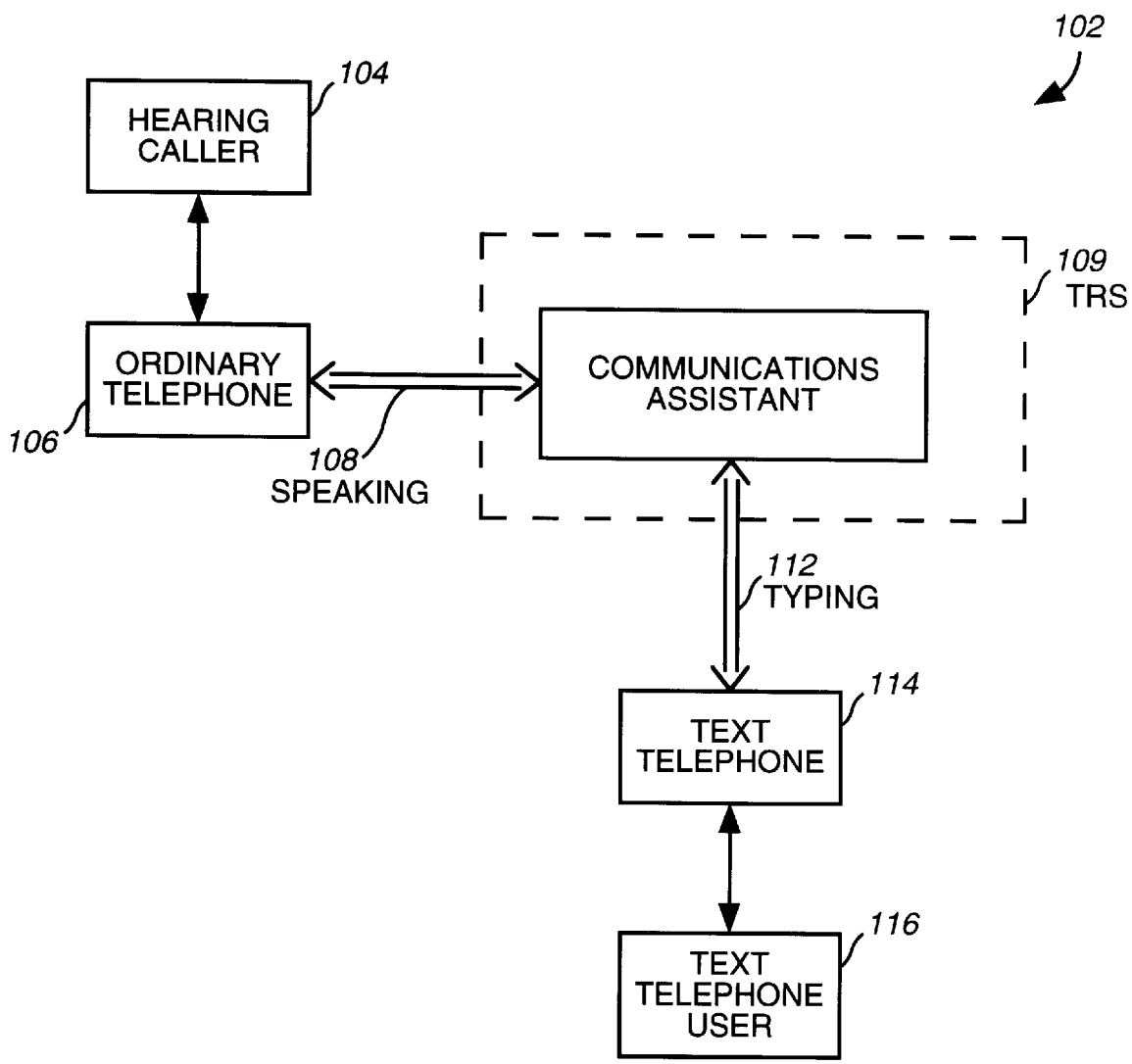
FIG. 1 is a block diagram of a typical telecommunications relay service environment used by the deaf, hard of hearing, or speech disabled.
Figure 2:
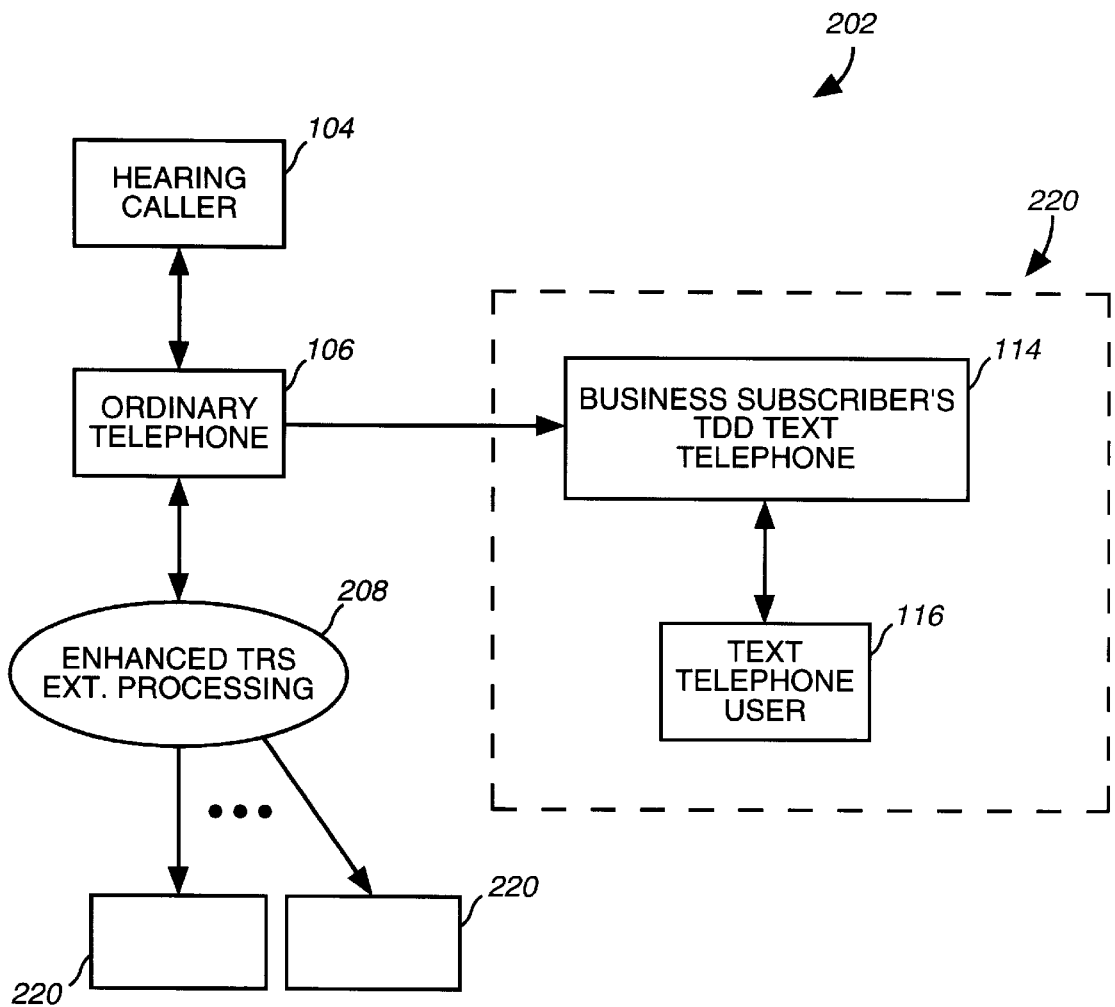
FIG. 2 is a block diagram of a telecommunications environment in accordance with the preferred embodiment of the present invention.

The present invention is directed to a system and method of directing a telephone call from a hearing customer using an ordinary telephone to a deaf, hard of hearing, or speech disabled business subscriber using a text telephone, via a telecommunications relay service (TRS). FIG. 2 is a high-level block diagram of a telecommunications environment 202 in accordance with the preferred embodiment of the present invention. A hearing customer 104 places a call using an ordinary telephone 106 dialing the toll-free extension main number advertised by the text telephone user 116. The call is routed to a central location—the Enhanced TRS Extension Processing system 208. The telephone call is then routed to one of a plurality of businesses 220 based on the specific extension number advertised along with the toll-free main number. Once the call is routed, the Enhanced TRS Extension Processing system 208 operates like a conventional TRS where the text telephone user 116 utilizes a text telephone 114 to communicate with the hearing caller 104, via a communications assistant (CA) 110.

FIG. 2 illustrates that the Enhanced TRS Extension Processing system 208 (via the main "1-800" number) can serve several subscribers, at different locations, each distinguished by their unique extension number. Extension numbers can be any combination of at least two digits (from 10 on up depending on the number of subscribers). This limitation is a function of current telephone switching technology. Furthermore, along with the unique extension number assigned to each text telephone user 116, the text telephone user may choose one of three service description options when applying for a subscription to the Enhanced TRS Extension Processing system 208 service. The text telephone user 116 can choose one of the following: (1) Standard Introduction—where the CA 110 identifies the name of the text telephone user 116, introduces the service using a standard identification, and adds an explanation if needed; (2) Customized Introduction—where the CA 110 will read the introduction from the subscriber profile (e.g., "This is TRS CA #3456, and I will be relaying this call for Mr. Smith of Robert's Marketing Company. He is hard of hearing and he uses our service to facilitate his phone calls."); or (3) Direct Connection—where the CA 110 will relay the call without identifying or explaining the TRS. The text telephone user 116 would be responsible for explaining the TRS and any necessary procedures to the hearing caller 104.

Table 1, above, illustrates the commercial disadvantages of conventional TRS systems, whereas the advantages of the Enhanced TRS Extension Processing system 208 are shown below in Table 2:

TABLE 2

ROBERT'S MARKETING COMPANY
200 Beech Ave.
Sand, FL 12345
Phone: 1-800-555-1234, ext. 123
FAX: 555-1820

The advertisement needs to contain less information, uses less lines, and consequently, costs the TRS subscriber less money. The advertisement will also not confuse potential customers who are not familiar with TRS or know what a CA is. Furthermore, customers will not be tempted to call the second number directly (because there is none) which previously resulted in a great deal of aggravation for both parties involved. Therefore, potential customers will more likely respond to advertisements without fear or anxiety that the business owner can not physically use the telephone or without the feeling that they have to do something extra just to get the same services or goods available elsewhere.

Figure 3:
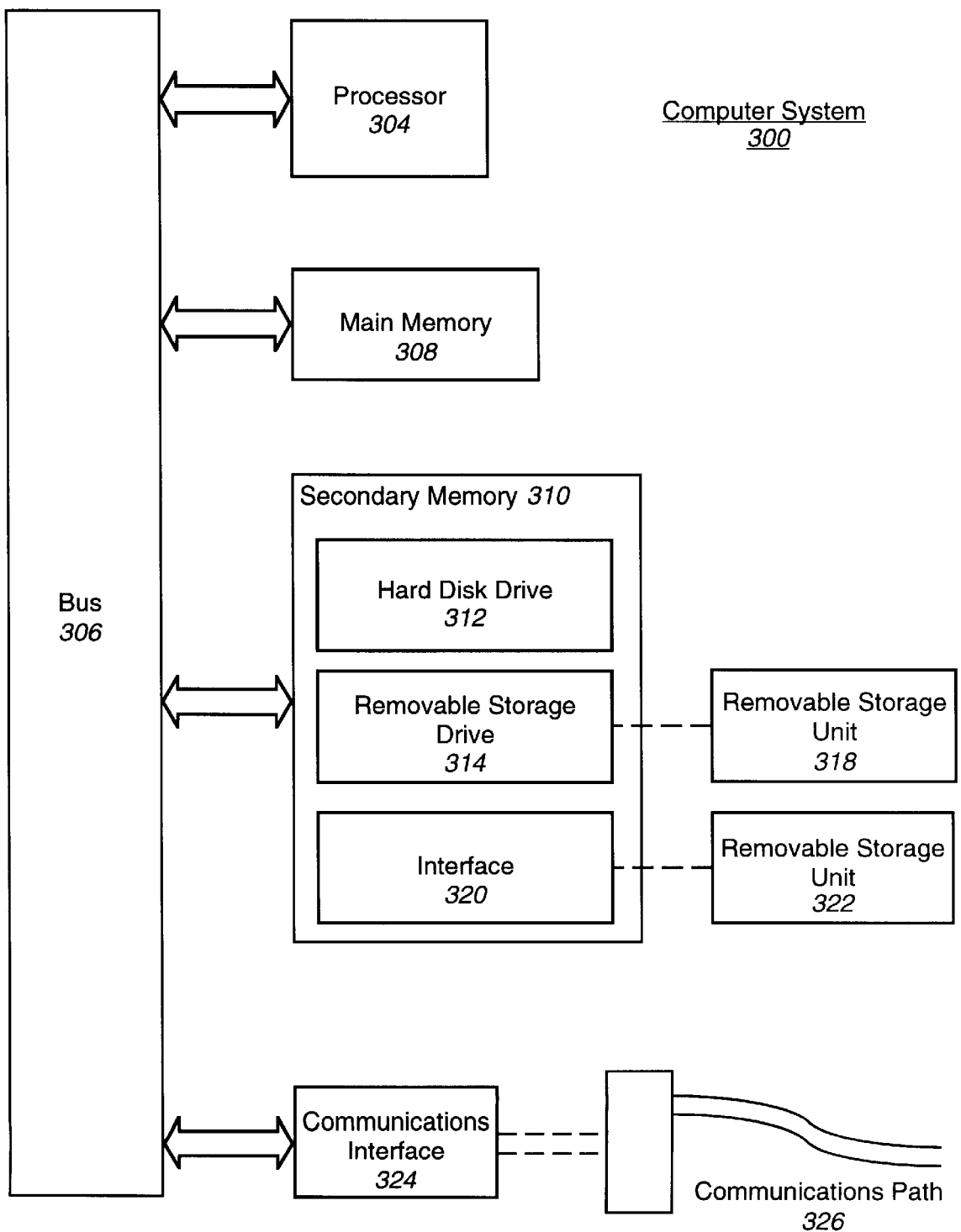
FIG. 3 is a block diagram of an exemplary computer system useful for implementing the present invention.

The chosen embodiment of the present invention is computer software running (that is, executing) within a computer system 300 shown in FIG. 3. The term "computer program product" is used to generally refer to a program stored at removable storage device 318 or a hard disk installed in hard disk drive 342. These computer program products are means for providing software to computer system 300.

Computer programs (also called computer control logic) are stored in main memory and/or secondary memory 340. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 342 or communications interface 324. Alternatively, the computer program product may be downloaded to computer system 300 over communications path 326. The control logic (software), when executed by the processor 304, causes the processor 304 to perform the functions of the invention as described herein.

In another embodiment the invention is implemented primarily in hardware using, for example, hardware components such as application specific integrated circuits (ASICs). Implementation of a hardware state machine so as to perform the functions described herein will be apparent to persons skilled in the relevant art(s).

Implementation

Figure 4A:
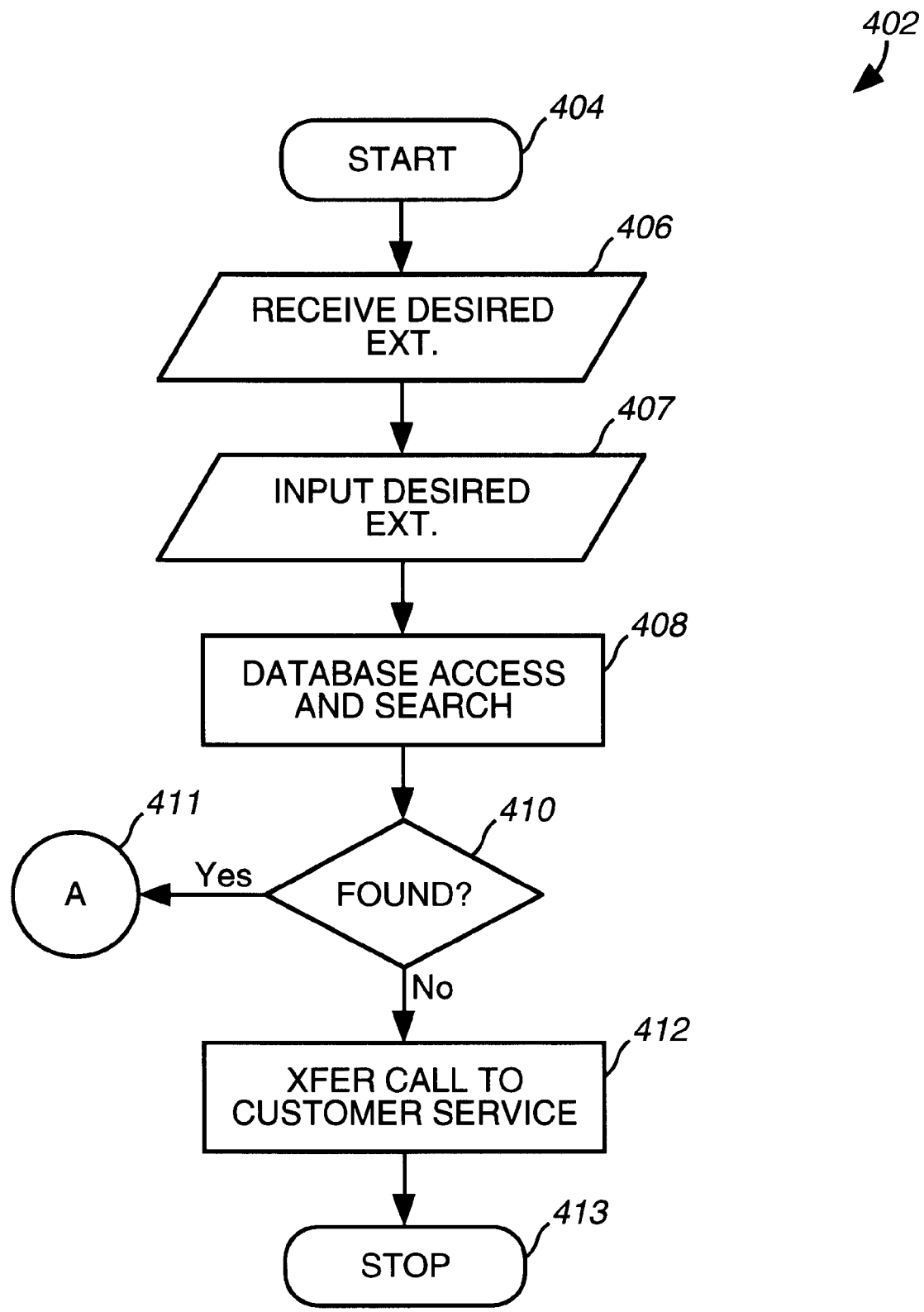
FIGS. 4(A) and 4(B) are flowcharts representing the overall preferred operation of the present invention.

Referring to FIG. 4(A), flowchart 402 represents the operation of the Enhanced TRS Extension Processing system 208. Flowchart 402 begins at step 404 with control passing immediately to step 406. In step 406 the hearing caller 104, having dialed the toll-free main number, requests a specific extension number. This request is received by the CA 110. In step 407, the CA 110 inputs the requested extension number into the Enhanced TRS Extension Processing system 208. In another embodiment of the present invention, the CA 110 would not have to request and manually input the desired extension number into the Enhanced TRS Extension Processing system 208 as shown in steps 406 and 407. Other input mechanisms could be utilized such as the caller 104 simply imputing the desired extension number, in response to an automated voice prompt, using the telephone keypad to transmit dual tone multiple frequency (DTMF) signals to the Enhanced TRS Extension Processing system 208.

In step 408, the database of the Enhanced TRS Extension Processing system 208 is accessed to search for a subscriber profile associated with the entered extension number. Step 410 determines if such an associated subscriber profile is found. If the associated subscriber profile is not found, the CA 110 in step 412 transfers the hearing caller 104 to a customer service representative (CSR). The CSR can then troubleshoot the call since no subscriber was found which matched the requested extension number. At this point, operation of flowchart 402 is complete, as indicated by step 413.

Figure 4B:
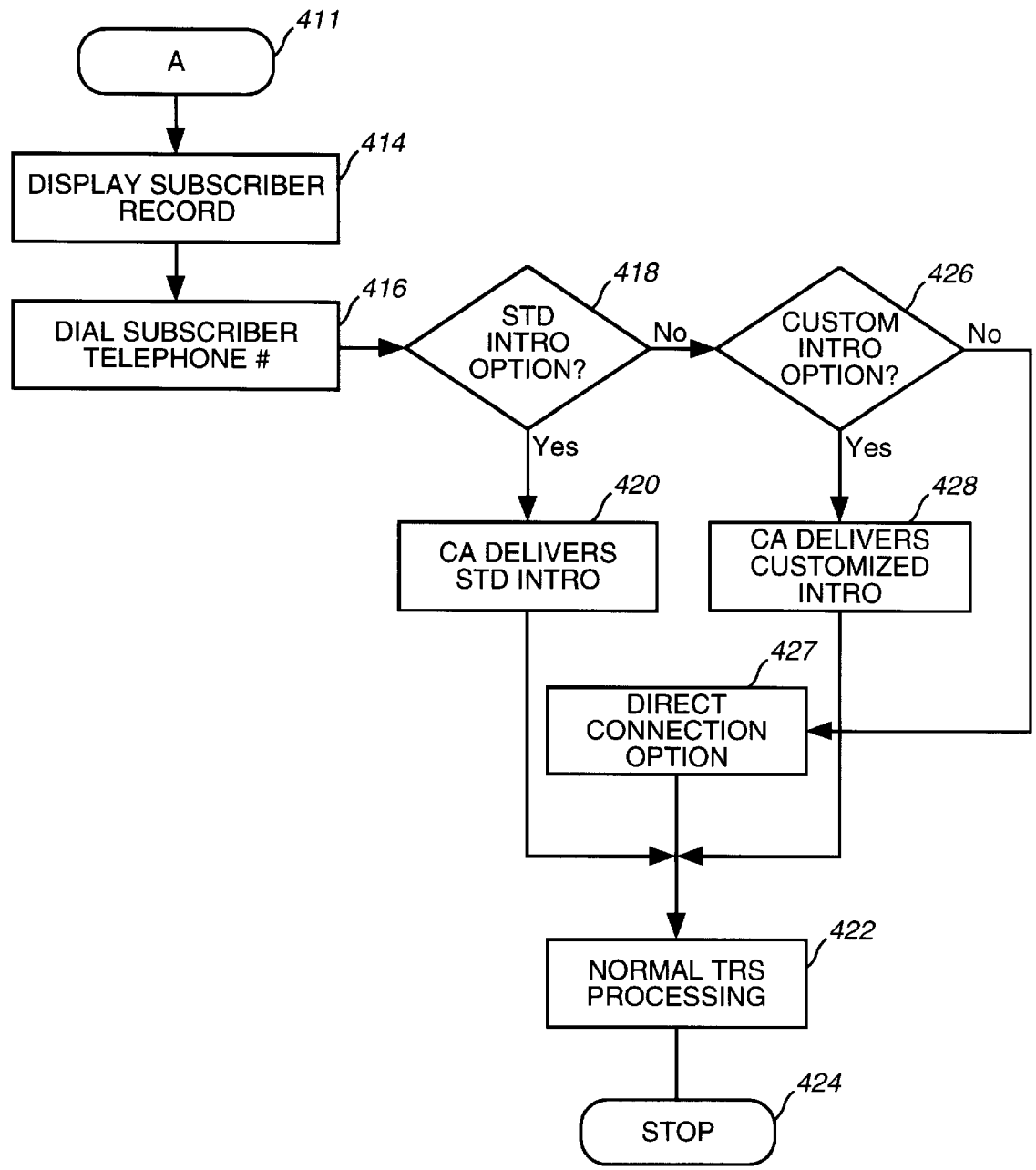

Referring again to step 410, if the associated subscriber profile is found, control passes to step 411. Referring to FIG. 4(B), step 411 immediately passes control to step 414. Step 414 displays the associated subscriber profile to the CA 110. The subscriber profile comprises of the name, ten-digit telephone number, and introduction option of the text telephone user 116. In step 416, the CA 110 then dials the ten-digit telephone number of the text telephone user 116. In another embodiment of the present invention, the CA 110 would not have to manually dial the telephone number of the text telephone user 116 as shown in step 416. Other dialing mechanisms could be utilized such as the Enhanced TRS Extension Processing system 208 automatically dialing the actual ten-digit telephone number.

In step 418, the CA 110 determines if the text telephone user 116 has selected the Standard Introduction option. If so, the standard introduction of the hearing caller 104 to the text telephone user 116 is given by the CA 110 at step 420. Then normal TRS service proceeds at step 422 until the hearing caller 104 and the text telephone user 116 have concluded their communication. At this point, Enhanced TRS Extension Processing system 208 operation is complete, as indicated by step 424.

Referring again to step 418, if the CA 110 determines that the text telephone user 116 has not selected the Standard Introduction option, step 426 is performed. Step 426 determines if the text telephone user 116 has selected the Customized Introduction option. If so, the customized introduction of the caller 104 to the text telephone user 116 is given by the CA 110 at step 428. Then normal TRS service proceeds at step 422 until the hearing caller 104 and the text telephone user 116 have concluded their communication. At this point, Enhanced TRS Extension Processing system 208 operation is complete, as indicated by step 424.

Referring again to step 426, if the CA 110 determines that the text telephone user 116 has not selected the Customized Introduction option, step 427 is performed. This is because if the text telephone user 116 has not chosen the Standard Introduction or Customized Introduction options, then Direct Connection must have been selected. Thus, control passes immediately to step 422 where normal TRS service proceeds until the hearing caller 104 and the text telephone user 116 have concluded their communication. At this point, Enhanced TRS Extension Processing system 208 operation is complete, as indicated by step 424.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for directing a telephone call from a caller using a standard telephone to a deaf, hard of hearing, or speech disabled person using a text telephone, via a telecommunications relay system including a communications assistant, the method comprising the steps of:

(1) receiving a toll-free telephone call from the caller to a central location;

(2) receiving a desired extension number provided by the caller;

(3) accessing the telecommunications relay system to retrieve an associated subscriber profile corresponding to said desired extension number;

(4) displaying said associated subscriber profile to the communications assistant;

(5) automatically dialing a telephone number specified by said associated subscriber profile independent of the assistant;

(6) determining a service description option associated with said subscriber profile; and (7) introducing said deaf, hard of hearing, or speech disabled person's telecommunications relay service to the caller according to said service description option.

2. The method of claim 1, wherein said step (6) comprises the step of determining whether said service description option is set to one of the following:

(i) standard introduction;

(ii) customized introduction; and (iii) direct connection.

3. The method of claim 1, wherein said step (2) comprises the step of permitting said desired extension number to be received by the communications assistant who then manually enters said desired extension number into the telecommunications relay system.

4. The method of claim 1, wherein said step (5) comprises the step of permitting the communications assistant to manually dial the telephone number specified by said associated subscriber profile.

5. A system for directing a telephone call from a caller using a standard telephone to a deaf, hard of hearing, or speech disabled person using a text telephone, via a telecommunications relay system including a communications assistant, comprising:

first receiving means for receiving a toll-free telephone call from the caller to a central location;

second receiving means for receiving a desired extension number provided by the caller;

third accessing means for accessing the telecommunications relay system to retrieve an associated subscriber profile corresponding to said desired extension number;

fourth displaying means for displaying said associated subscriber profile to the communications assistant;

fifth dialing means for automatically dialing a telephone number specified by said associated subscriber profile independent of the assistant;

sixth determining means for determining a service description option associated with said subscriber profile; and seventh introducing means for introducing said deaf, hard of hearing, or speech disabled person's telecommunications relay service to the caller according to said service description option.

6. The system of claim 5, wherein sixth said means for determining a service description option associated with said subscriber profile comprises means for determining whether said service description option is set to one of the following:

(i) standard introduction;

(ii) customized introduction; and (iii) direct connection.

7. A computer program product for use with a computer comprising:

a computer usable medium having readable program code means embodied in said medium for generating object code for a computer program having executable object code, said computer program product having:

first computer readable program code means for receiving a toll-free telephone call from a caller to a central location;

second computer readable program code means for receiving a desired extension number provided by the caller;

third computer readable program code means for accessing a telecommunications relay system to retrieve an associated subscriber profile corresponding to said desired extension number;

fourth computer readable program code means for displaying said associated subscriber profile to a communications assistant; and fifth computer readable program code means for automatically dialing a telephone number in response to receiving the extension number specified by said associated subscriber profile.

\* \* \* \* \*